United States Patent [19]

Lu

[11] Patent Number: 4,667,819
[45] Date of Patent: May 26, 1987

[54] RETENTION DEVICE FOR FLOPPY DISK PACK

[76] Inventor: Kin S. Lu, 156, Si-Ning S. Rd., Taipei, Taiwan

[21] Appl. No.: 831,095

[22] Filed: Feb. 19, 1986

Related U.S. Application Data

[63] Continuation-in-part of Ser. No. 740,052, May 30, 1985, abandoned.

[51] Int. Cl.$^4$ .................... B65D 85/57; B65D 85/30
[52] U.S. Cl. .................... 206/312; 206/311; 206/444; 206/477; 206/482; 40/159; 229/68 R
[58] Field of Search ............ 206/312, 309, 311, 444, 206/477, 482, 483, 44.11, 455; 40/159, 158 A; 229/68 R

[56] References Cited

U.S. PATENT DOCUMENTS

| | | | |
|---|---|---|---|
| 454,416 | 6/1891 | Albercht | 206/482 |
| 498,761 | 6/1893 | Becker | 40/159 |
| 977,292 | 11/1910 | Gair | 206/477 |
| 1,285,441 | 11/1918 | Snider | 40/159 |
| 1,317,946 | 10/1919 | Snively | 40/159 |
| 1,347,269 | 7/1920 | Greble | 229/68 R |
| 1,502,248 | 7/1924 | Hawley | 206/44.11 |
| 1,719,681 | 7/1929 | Wirbusch | 206/44.11 |
| 1,834,570 | 12/1931 | Becker et al. | 229/68 R |
| 2,178,067 | 10/1939 | Cohen | 206/482 |
| 2,718,304 | 9/1955 | Jaron | 206/482 |
| 3,339,729 | 9/1967 | Becker | 206/459 |
| 3,530,984 | 9/1970 | Howard | 206/483 |
| 3,927,765 | 12/1975 | Beal | 206/482 |
| 3,979,051 | 9/1976 | Close | 206/455 |
| 4,071,144 | 1/1978 | Krubski | 206/477 |
| 4,473,153 | 9/1984 | Colangelo | 206/444 |
| 4,508,366 | 4/1985 | Brindle | 206/309 |
| 4,549,658 | 10/1985 | Sfikas | 206/312 |
| 4,589,532 | 5/1986 | Clevalier | 206/461 |

FOREIGN PATENT DOCUMENTS

| | | | |
|---|---|---|---|
| 914835 | 7/1954 | Fed. Rep. of Germany | 229/68 R |
| 3020994 | 12/1981 | Fed. Rep. of Germany | 206/44.11 |
| 817084 | 8/1937 | France | 206/44.11 |
| 1475792 | 2/1967 | France | 206/312 |
| 14490 | of 1907 | United Kingdom | 229/68 R |
| 10795 | of 1912 | United Kingdom | 206/44.11 |
| 444555 | 12/1934 | United Kingdom | 40/159 |

Primary Examiner—William Price
Assistant Examiner—Brenda J. Ehrhardt
Attorney, Agent, or Firm—Mason, Fenwick & Lawrence

[57] ABSTRACT

A retention device for floppy disk pack is disclosed. This device comprises a substrate which is provided with respective upper and lower retention means for retaining and supporting the upper and lower ends of a floppy disk pack, respectively, in such way that the tongue portion of the upper end of floppy disk pack is just fully inserted into the upper retention means by the guidance of the opposite slant edges of a tongue portion on the upper retention means so as to receive the tongue portion on the upper retention means completely within the floppy disk pack and to leave the opening of the pack outside.

9 Claims, 8 Drawing Figures

RETENTION DEVICE FOR FLOPPY DISK PACK

This is continuation-in-part application of Ser. No. 740,052 filed May 30, 1985, now abandoned.

This invention relates to a retention device for floppy disk pack.

Conventionally, each floppy disk for computer has a pack for protection. The pack is in form of open envelope with a tongue portion extending over the opening at upper end. A plurality of disks along with respective pack are contained in a storage box. The disadvantages thereof are apparent that it is difficult to find out exactly the desirable disk among whole stack of disks within the box, and it is also inconvenient to carry the box.

Among prior art, U.S. Pat. No. 977,292 disclosed a display-card which is provided with slots b to engage additional flap f of box to hold said box attached to said card. U.S. Pat. No. 1,502,248 disclosed a card-display stand which is to provide a display box equipped with novel card exhibiting means capable of being erected to a substantially upright position on the box. These cannot be used for filing of the floppy disk.

Moreover, U.S. Pat. No. 4,473,153 provided a flexible disk cartridge envelope and U.S. Pat. No. 4,508,366 provided the holders for computer disks and the like, in which the disk is simply removably inserted into the pocket, no retention means for the cartridge is conceived.

The main object of this invention is to provide a retention device for securely and releasably retaining a floppy disk pack with the floppy disk being readily inserted into and removed from the associated pack while the later in retained state, which may be constructed either together in any number as a file holder or single as an individual holding file for easy selection and convenient carrying with the user.

Other objects and features of this invention will be apparent from the following description in detail of the preferred embodiments for the illustrative purposes, with reference to the accompanying drawings, in which.

Figure 1:
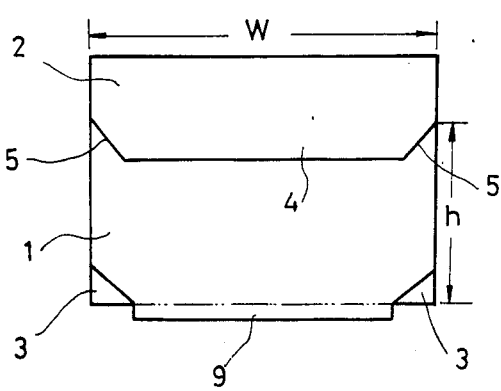
FIG. 1 is a front view of one embodiment of a retention device according to the present invention.

Now, referring to the embodiment as shown in FIG. 1 of the drawings, the retention device for the floppy disk pack according to the present invention comprises a substrate 1 which may be of suitable material including papers, cardboards, plastic sheets and composite material formed by papers and/or cardboards with plastic coatings. The substrate material is preferably subjected to anti-static treatment.

On the substrate 1 it is provided with an upper and a lower retention means 2 and 3, respectively, on upper and lower sides of said substrate 1. In this embodiment, both means 2 and 3 are formed by folding a number of flaps unitary extending from the substrate 1 over it, as explained hereinafter. The upper retention means 2 has a tongue portion 4 which is inclined at both sides with opposite slant edges 5 and extended horizontally at intermediate portion in substantial parallel to the upper and bottom edges in substantial parallel of the substrate 1. The upper retention means 2 has a transverse width w substantial equal to or slight greater than the transverse width w' of the floppy pack 6 to be used herewith as shown in FIG. 4.

The lower retention means 3 is composed of a pair of triangle means extended in opposite direction to each other at an angle relative to the upper and bottom edges of the substrate 1 in a distance therebetween substantial equal to the width w of said upper retention means 2. Said angle as well as the inclination of said slant edges 5 are not critical, but preferably in a range of 30° to 60° with respect to the upper and bottom edges of the substrate 1, and about 45° is more preferred. The height h from bottom ends of the pair of triangle means 3 to the upper ends of slant edges 5 is substantial equal to the height h' from bottom to the opening 11 of a floppy disk pack 6, as mentioned hereinafter.

Figure 2:
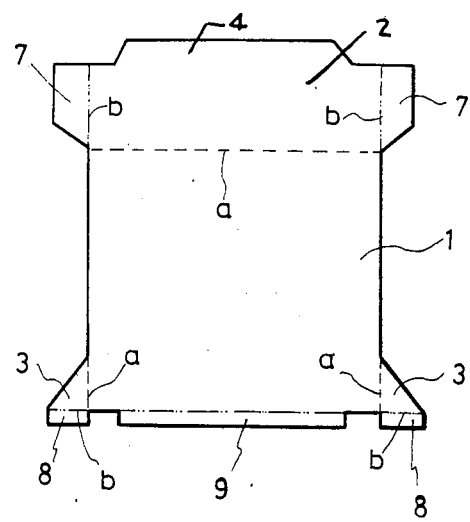
FIG. 2 is a plane view of the blank for the retention device as shown in FIG. 1.

The retention device as illustrated in FIG. 1 is formed by folding a blank as shown in FIG. 2 over itself. As shown in FIG. 2, this blank has a section for substrate 1, a section for upper retention means 2 with tongue portion 4, this section is extended longitudinally from top of the section for substrate 1 and has two side flaps 7 at opposite sides, and a pair of substantial triangular lugs 3 extended from lower end of the section for substrate 1 at opposite sides. Each lug 3 has respective bottom flap 8 extended from bottom edge thereof. At intermediate portion of the bottom edge on section for substrate 1 there is an extension 9. This blank is folded firstly along imaginary lines a over the substrate 1 to form the upper and lower retention means 2 and 3, respectively, and secondly along imaginary lines lines b under the substrate 1 and secured thereunder by glueing and the like. In this way, the retention device as shown in FIG. 1 is accomplished.

Figure 3:
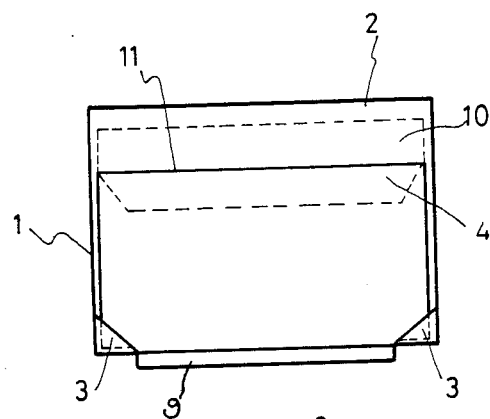
FIG. 3 is a front view illustrating the retention device as shown in FIG. 1 retaining a floppy disk pack.
Figure 4:
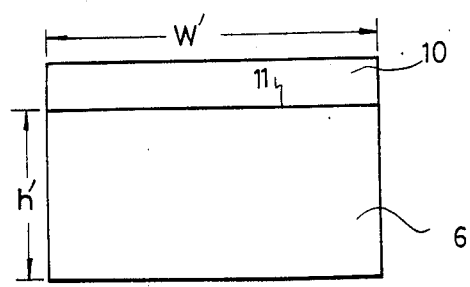
FIG. 4 is a front view of a floppy disk pack.

Next, as illustrated in FIG. 3 the retention device may securely and releasably retain a floppy disk pack 6 as shown in FIG. 4. The pack 6 has an tongue portion 10 extended from its back side over the upper edge 11 of its front side, i.e. the opening of the pack 6. At first, the tongue portion 10 of the pack 6 is inserted into the upper retention means 2 of the device while, on the contrary, the tongue portion 4 of said upper retention means 2 is smoothly inserted into the pack 6 through the opening 11 by the guidance of the slant edges 5 thereof, then the lower corners of the pack 6 are inserted and retained in the pair of lower retention means 3. In this way, the opening 11 of the pack 6 is just left outside of the upper retention means 2 for readily insertion and removal of a floppy disk 12 as referred to FIG. 5. Since the tongue portion 4 of the retention means 2 is reversely fully inserted into the pack 6, so that a neat appearance is reached, on other words, no risk on exposure of the margin of upper retention means will be occured. In addition, the pack 6 is more securely retained by the retention device.

Figure 5:
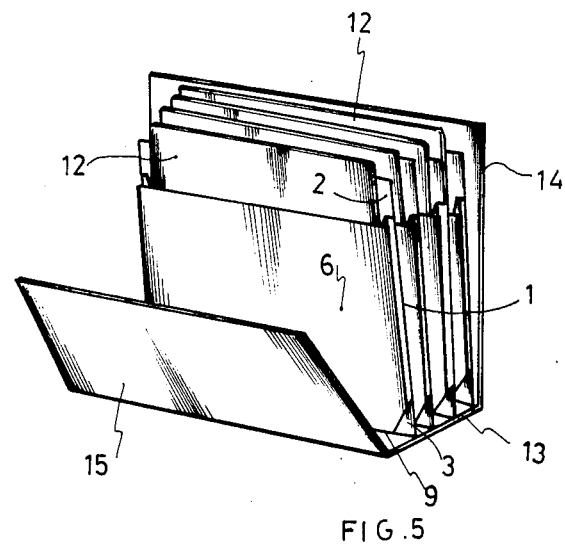
FIG. 5 is a perspective view illustrating a file holder composed of a plurality of the retention device as shown in FIG. 1, with the floppy disks are removably inserted into respective retained pack.

The retention device according to one embodiment of the present invention as shown in FIG. 1 may be assembled together in any number as a file holder, such as shown in FIG. 5 by engaging the extension 9 of each device on the central portion 13 of a holder in sequential order. Then each device 1 may receive and retain a pack 6 or a pack 6 with floppy disk 12 to form a file. The floppy disk 12 may be removed or displaced individually while the pack 6 is remaind in place, or together with the pack 6, as desired. The holder includes a back wall 14 in register with top rim of the disk 12 for supporting whole file and a shorten front wall 15 for protection the front side of the file, i.e. the front pack, and/or for any indication.

Figure 6:
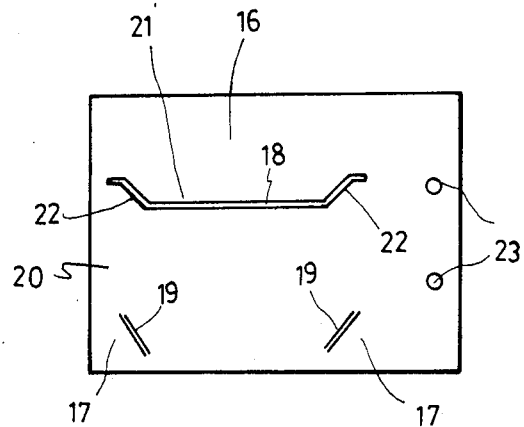
FIG. 6 is a front view of another embodiment of a retention device according to the present invention.
Figure 7:
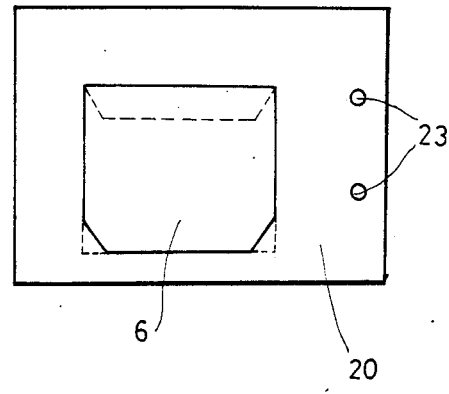
FIG. 7 is a front view illustrating the retention device as shown in FIG. 6 retaining a floppy disk pack.

Another embodiment is illustrated in FIGS. 6 and 7 in which the upper and lower retention means 16 and 17, respectively, are formed by cutting respective slit lines 18 and 19 on the substrate 20 itself. Similar to the embodiment as shown in FIG. 1, the upper retention means 16 has a tongue portion 21 which is inclined at both sides with opposite slant edges 22 and extended horizontally at intermediate portion in substantial parallel to the upper and bottom edges in substantial parallel of the substrate 20. Other conditions are similar and thus referred to afore-mentioned embodiment. On the substrate 20, at least two binding holes 23 may be preformed or punched at one side so as to make available for binding a plurality of identical substrate 20 together to form a book-like file holder.

In FIG. 7 it is shown that the retention device of this embodiment may also securely and releasably retain a floppy disk pack 6 as shown in FIG. 4 in a manner similar to as described above in reference with FIG. 3 provided that the substrate 20 is bigger than the substrate 1.

Figure 8:
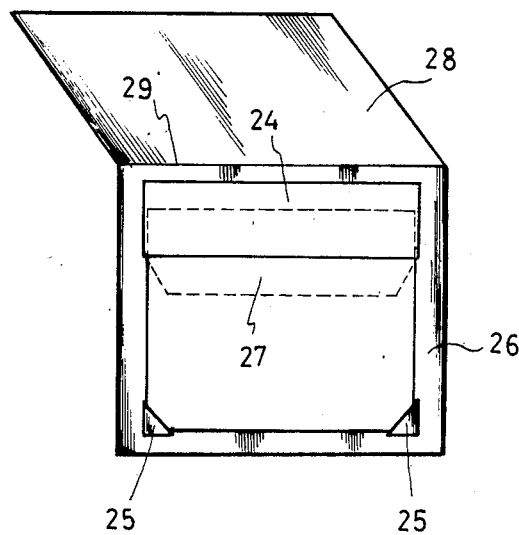
FIG. 8 is a perspective view illustrating still another embodiment of a retention device according to the present invention.

Still another embodiment is illustrated in FIG. 8 in which the upper and lower retention means 24 and 25, respectively, are attached on the substrate 26. The upper retention means 24 has also a tongue portion 27 just as mentioned in two preceeding embodiments. In this embodiment the substrate 26 is extended to form a cover 28 which can be folded along the folding line 29 over the retention device and the pack 6 with inserted floppy disk, not shown, for protection. The cover 28 is preferably dimensioned as the size of substrate 26.

From the foregoing it would be observed that numerous variations and modification may be effected without departing from the true spirit and scope of the novel concept of this invention.

What I claim is:

1. A retention device for floppy disk pack comprising a substrate having upper and bottom edges in substantial parallel, an upper retention means provided on upper side of said substrate with a transverse width substantially equal to the transverse width of said floppy disk pack and constructed to have a tongue portion being inclined at both sides with opposite slant edges and extended horizontally at intermediate portion in substantial parallel to said upper and bottom edges of said substrate, and a lower retention means including a pair of triangle means extended in opposite direction to each other at an angle relative to said upper and bottom edges of said substrate in a distance therebetween substantially equal to the width of said upper retention means, the height from bottom ends of said pair of triangle means to the upper ends of said slant edges being substantially equal to the height from bottom to the opening of said floppy disk pack.

2. A device as set forth in claim 1, wherein said upper and lower retention means are formed by providing a blank which has a section for substrate, a section for upper retention means with tongue portion being extended longitudinally from top of said section for substrate and having two side flaps at opposite sides, and a pair of substantial triangular lugs extended from lower end of said section for substrate at opposite sides and provided with respective bottom flap extended from bottom edge thereof, folding said section for upper retention means and said pair of triangular lugs over said section for substrate, and then folding said side flaps and bottom flaps under said section for substrate and thus secured thereunder.

3. A device as set forth in claim 1 further comprising an extension at intermediate portion from the bottom edge of said substrate.

4. A device as set forth in claim 3, wherein said device may be assembled together in any number on a holder by engaging said extention of designated number of said device in sequential order on the central portion of said holder with said upper retention means at upper side to retain said floppy disk pack maintaining the opening of said pack outside of said device for readily insertion and removal of necessary floppy disk.

5. A device as set forth in claim 4, wherein said holder further includes a back wall in register with top rim of said disk when the latter is inserted into said pack and a shorter front wall for protection front side of the front pack.

6. A device as set forth in claim 1, wherein said upper and lower retention means are formed by cutting respective slit lines on said substrate itself.

7. A device as set forth in claim 6, wherein said substrate further comprises at least two binding holes at one side.

8. A device as set forth in claim 1, wherein said upper and lower retention means are formed by attaching the same on said substrate.

9. A device as set forth in claim 8, wherein said substrate is extended to form a cover dimensioned as the size of said substrate, and wherein a folding line is formed between said substrate and said cover so as to let said cover may be folded over said substrate.

* * * * *